United States Patent
Masters

(10) Patent No.: US 6,301,560 B1
(45) Date of Patent: *Oct. 9, 2001

(54) DISCRETE SPEECH RECOGNITION SYSTEM WITH BALLOONING ACTIVE GRAMMAR

(75) Inventor: Steven P. Masters, Kent, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,055

(22) Filed: Jan. 5, 1998

(51) Int. Cl.[7] ................................................. G10L 15/22
(52) U.S. Cl. ............................................ 704/251; 704/275
(58) Field of Search ................................... 704/231, 251, 704/254, 255, 270, 275

(56) References Cited

U.S. PATENT DOCUMENTS

| | | | |
|---|---|---|---|
| 4,783,803 | * 11/1988 | Baker et al. | 704/252 |
| 5,350,176 | * 9/1994 | Hochstein et al. | 463/42 |
| 5,465,378 | 11/1995 | Duensing et al. | |
| 5,632,002 | 5/1997 | Hashimoto et al. | |
| 5,664,061 | * 9/1997 | Andreshak et al. | 704/275 |
| 5,752,232 | 5/1998 | Bosore et al. | |
| 5,778,344 | * 7/1998 | Attwater et al. | 704/275 |
| 5,794,164 | * 8/1998 | Berkert et al. | 701/36 |
| 5,867,817 | * 2/1999 | Catallo et al. | 704/255 |
| 5,873,064 | * 2/1999 | De Armas et al. | 704/275 |
| 5,974,384 | * 10/1999 | Yasuda | 704/275 |

FOREIGN PATENT DOCUMENTS 785 540 A2   7/1997   (EP).

* cited by examiner

Primary Examiner—William Korzuch
Assistant Examiner—Martin Lerner
(74) Attorney, Agent, or Firm—Lee & Hayes, PLLC

(57) ABSTRACT

A discrete speech recognition system has a default grammar with keywords and non-keywords. Upon detecting a non-keyword, the speech recognition system performs the function associated with the detected word. Upon detecting a keyword in the default grammar, the speech recognition system temporarily expands its active grammar list from the default grammar to a ballooned grammar that includes both the words in the default grammar and the additional words triggered by detection of the keyword. In this manner, the operator still has the option to select a word from the original grammar, or choose a word from the additional second-tier list. The ballooned grammar remains active until the operator makes a new selection. The speech recognition system then returns to the default grammar.

31 Claims, 9 Drawing Sheets

DISCRETE SPEECH RECOGNITION SYSTEM WITH BALLOONING ACTIVE GRAMMAR

TECHNICAL FIELD

This invention relates to discrete speech recognition systems. More particularly, this invention relates to discrete speech recognition systems with ballooning grammars. This invention further relates to vehicle computer systems that implement such discrete speech recognition systems.

BACKGROUND OF THE INVENTION

Two common types of speech recognition systems are continuous and discrete. Continuous speech recognition systems detect and discern useful information from continuous speech patterns. In use, an operator may speak phrases and sentences without pausing and the continuous speech recognition system will determine the words being spoken. Continuous speech recognition systems are used, for example, in voice-input word processors that enable operators to dictate letters directly to the computer.

In contrast, discrete speech recognition systems are designed to detect individual words and phrases that are interrupted by intentional pauses, resulting in an absence of speech between the words and phrases. Discrete speech recognition systems are often used in "command and control" applications in which an operator speaks individual commands to initiate corresponding predefined control functions. In a typical use, the operator speaks a command, pauses while the system processes and responds to the command, and then speaks another command. The system detects each command and performs the associated function.

This invention is directed to the discrete class of speech recognition systems.

A discrete speech recognition system employs a complete list of recognized words or phrases, referred to as the "vocabulary." A subset of the vocabulary that the recognition system is attempting to detect at any one time is known as the "grammar." In general, the smaller the active grammar, the more reliable the recognition because the system is only focusing on a few words or phrases. Conversely, the larger the active grammar, the less reliable the recognition because the system is attempting to discern a word or phrase from many words or phrases.

Accordingly, one design consideration for discrete speech recognition systems is to devise grammars that present useful command options, while being reliably detectable.

One conventional approach is to construct a large grammar that encompasses each command option. FIG. 1 shows how this conventional approach might be applied to control an automobile radio. In this example, suppose the system is designed to allow the user to control the radio and access his/her favorite radio stations using voice commands. Using a large-size active grammar, a default radio grammar 20 might include the radio control words-"AM", "FM", "Seek", and "Scan"-and all of the preset radio stations. A corresponding command function is associated with each grammar word, as represented in Table 1.

TABLE 1

Default Grammar

| Word/Phrase | Command Function |
|---|---|
| AM | Sets the radio to AM band. |
| FM | Sets the radio to FM band. |
| Seek | Directs the radio to seek to a new station. |
| Scan | Directs the radio to scan for a new station. |
| One | Sets the radio to preset station 1. |
| Two | Sets the radio to preset station 2. |
| Three | Sets the radio to preset station 3. |
| Four | Sets the radio to preset station 4. |
| Five | Sets the radio to preset station 5. |
| Six | Sets the radio to preset station 6. |
| Seven | Sets the radio to preset station 7. |
| Eight | Sets the radio to preset station 8. |
| Nine | Sets the radio to preset station 9. |
| Ten | Sets the radio to preset station 10. |

The speech recognition system actively tries to recognize one of these words when the operator speaks. When a grammar word is detected, the speech recognition system performs the appropriate function. Suppose the operator says is the word "AM". The discrete speech recognition system detects the active word 22 and performs the corresponding function 24 to set the radio to the AM band.

As noted above, a drawback with presenting a large all-encompassing grammar is that there is a greater likelihood of false recognition by the speech system. For instance, the system may experience trouble distinguishing between the words "FM" and "Seven" when both are spoken rapidly and/or not clearly enunciated.

Another conventional approach is to construct a small default grammar and to switch to a new grammar upon detection of one or more keywords. FIG. 2 shows how this conventional approach might be applied to control an automobile radio. With this approach, a default radio grammar 30 might include only the radio control words-"AM", "FM", "Seek", "Scan", and "Preset". A corresponding command function is associated with each grammar word, as represented in Table 2.

TABLE 2

Default Grammar

| Word/Phrase | Command Function |
|---|---|
| AM | Sets the radio to AM band. |
| FM | Sets the radio to FM band. |
| Seek | Directs the radio to seek to a new station. |
| Scan | Directs the radio to scan for a new station. |
| Preset | Keyword to bring up preset station grammar |

Upon recognition of the keyword "preset", the speech recognition system changes to a new grammar 32 for detecting the preset station numbers. Table 3 lists the new preset station grammar.

TABLE 3

Preset Station Grammar

| Word/Phrase | Command Function |
|---|---|
| One | Sets the radio to preset station 1. |
| Two | Sets the radio to preset station 2. |
| Three | Sets the radio to preset station 3. |
| Four | Sets the radio to preset station 4. |

TABLE 3-continued

Preset Station Grammar

| Word/Phrase | Command Function |
|---|---|
| Five | Sets the radio to preset station 5. |
| Six | Sets the radio to preset station 6. |
| Seven | Sets the radio to preset station 7. |
| Eight | Sets the radio to preset station 8. |
| Nine | Sets the radio to preset station 9. |
| Ten | Sets the radio to preset station 10. |

The speech recognition system actively tries to recognize one of these words from the preset station grammar. Suppose the operator says the word "One". The discrete speech recognition system detects the active word 34 and performs the corresponding function 36 to set the radio to the preset station 1.

A drawback with this system is navigation of the grammars. An operator may call out a keyword in one grammar, causing the system to switch to a different grammar, and then subsequently be interrupted (e.g., driving in traffic) and forget which grammar is currently active upon returning his/her attention to the radio. For instance, suppose the operator had called out "preset" to get the preset station grammar of Table 3 and then subsequently became interrupted. The operator may then wish to seek or scan, but the system will not recognize these commands because the active grammar is currently looking for a preset station number.

Accordingly, there is a need to improve techniques for presenting grammars in discrete speech recognition systems for such applications as operating a vehicle radio.

SUMMARY OF THE INVENTION

This invention concerns a discrete speech recognition system with a ballooning grammar. The system begins with a default grammar that has both keywords and non-keywords. Upon detecting a word that is not a keyword in the default grammar, the speech recognition system simply performs the function associated with the detected word. Upon detecting a keyword in the default grammar, the speech recognition system expands its active grammar list from the default grammar to a ballooned grammar that include both the words in the default grammar and the additional words triggered by detection of the keyword. In this manner, the operator still has the option to select a word from the original grammar, or choose a word from the additional list.

The ballooned grammar remains active until the operator makes a new selection. With a bi-level system (meaning the system balloons the grammar only once), the speech recognition system returns to the default grammar. In a higher level system in which multiple ballooned grammars may be used, the operator can work his/her way through the grammars, with each level including the words from the default grammar and words that are added along the way. In one implementation of a higher level system, words that are effectively rendered useless by subsequent selections can be removed from the active ballooned vocabulary. At the end of the traversal through the levels, the speech recognition system returns to the default grammar.

This system advantageously offers a flexible balance between small-size default grammars and greater functionality enabled by large size grammars to thereby mitigate the possibility of false or erroneous recognition.

DETAILED DESCRIPTION

Figure 1:
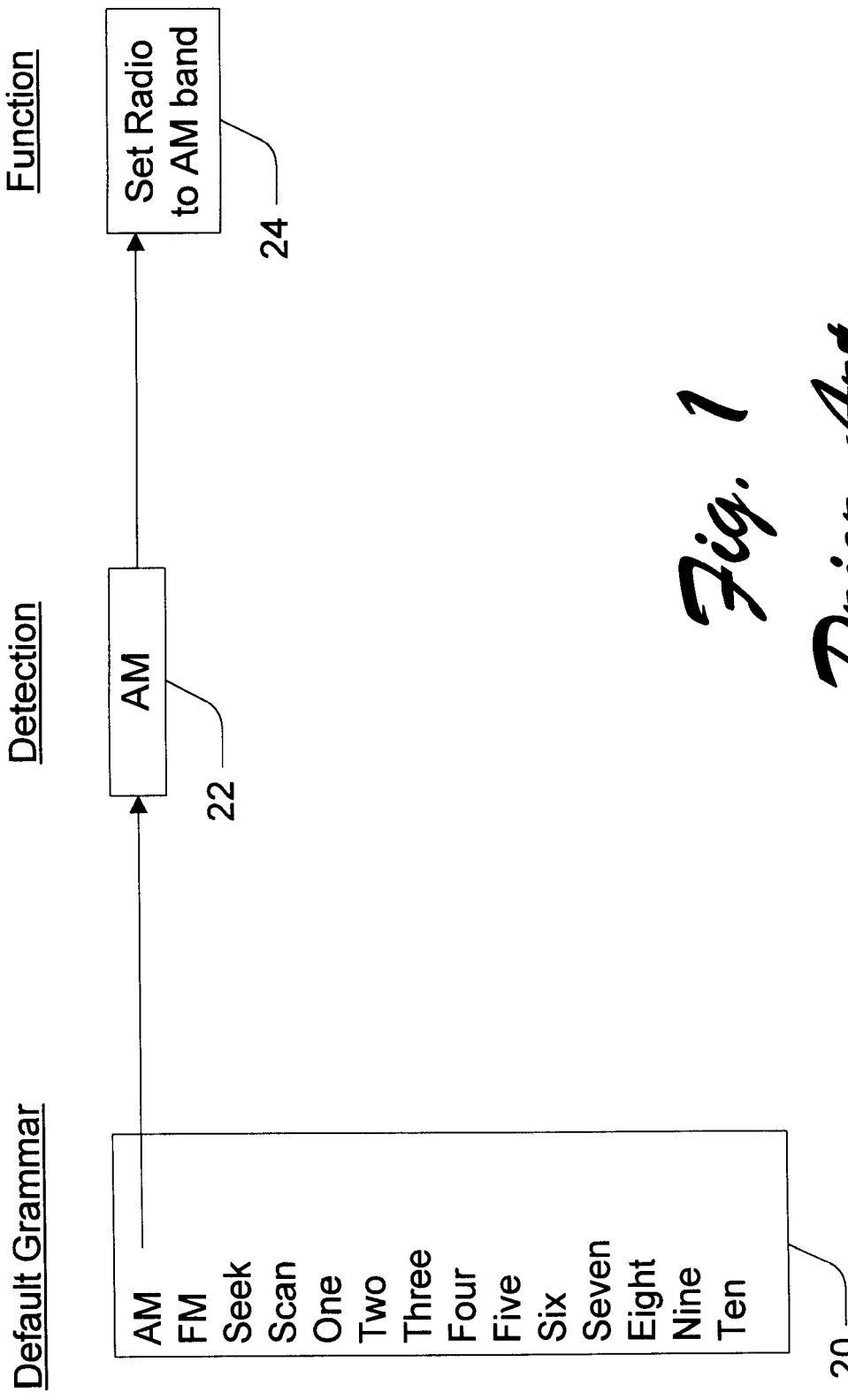
FIG. 1 shows a conventional approach of employing a large all-encompassing default grammar.
Figure 2:
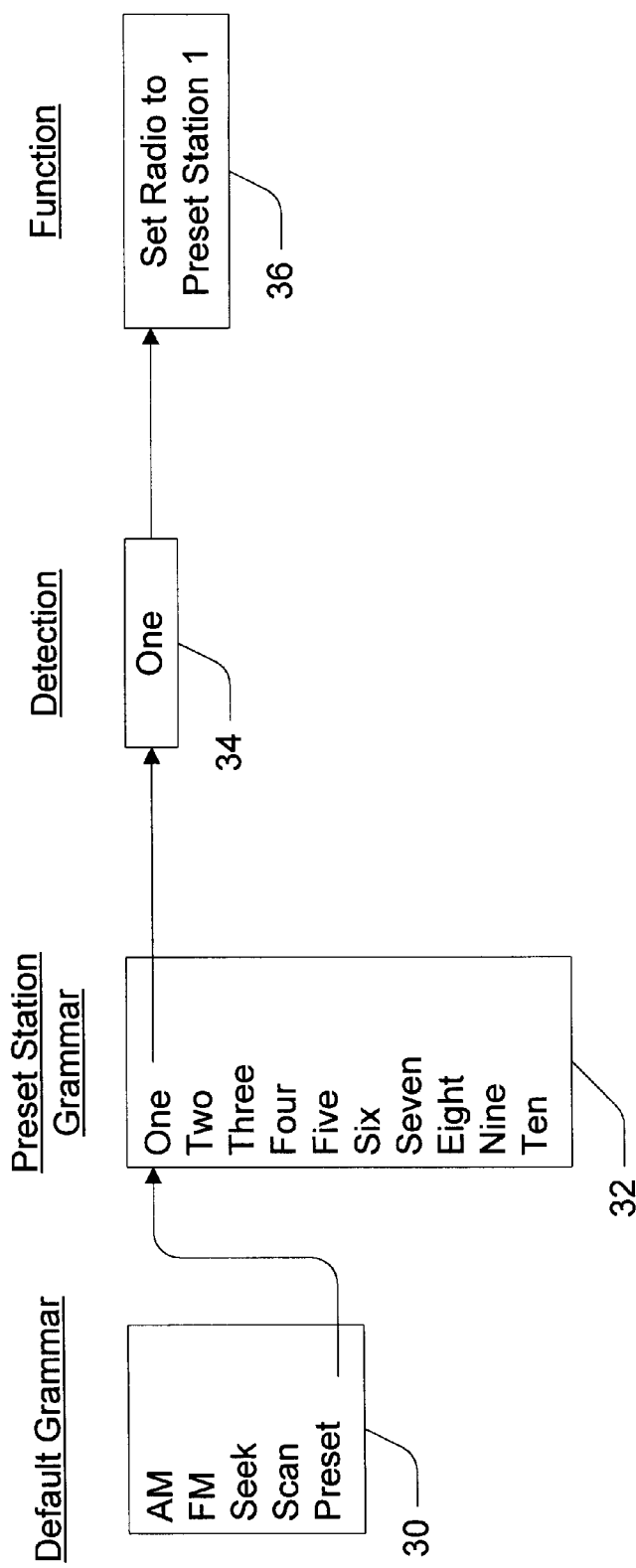
FIG. 2 shows a conventional approach of using a small default grammar and switching to a new grammar upon selection of a keyword.
Figure 3:
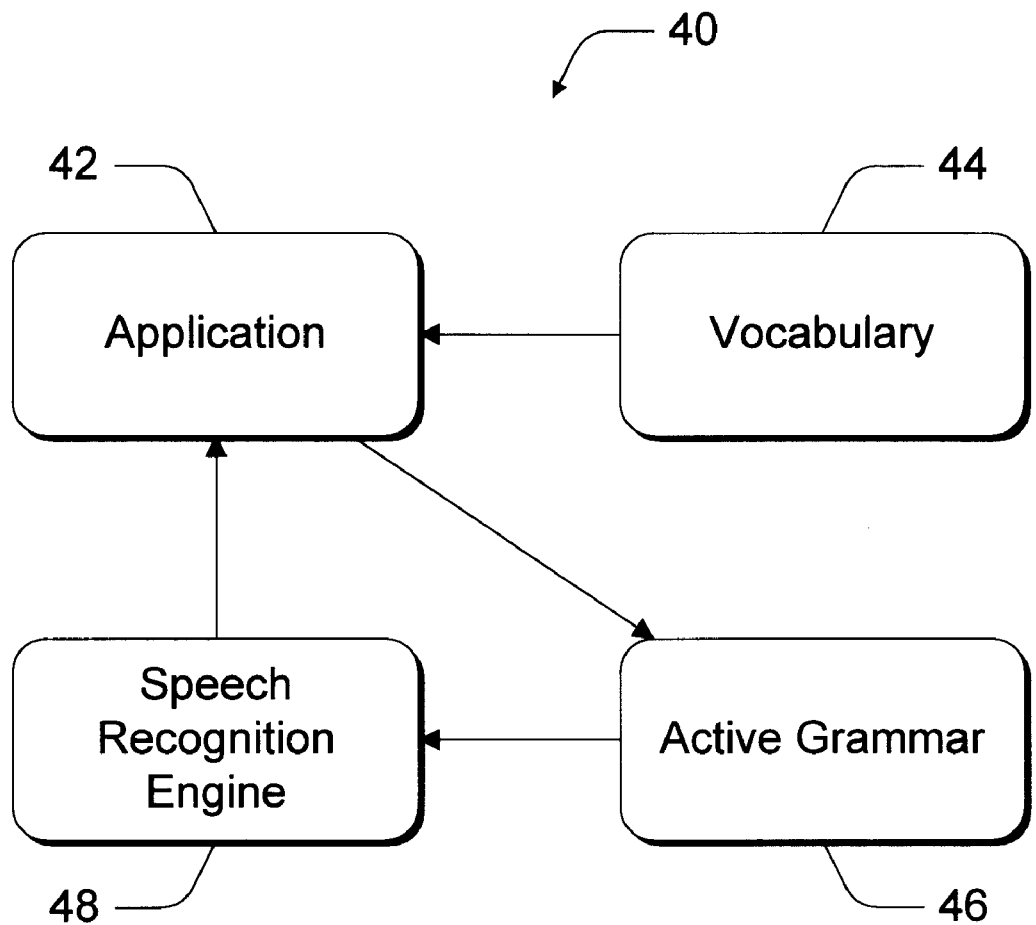
FIG. 3 is a functional block diagram of a discrete speech recognition system.

FIG. 3 shows a discrete speech recognition system 40 that recognizes individual words or phrases. As used herein, the term "utterances" means a word, phrase, or other spoken sound that is detectable as a discrete voice input to the speech recognition system. The discrete speech recognition system 40 includes an application 42, a vocabulary 44, an active grammar 46, and a speech recognition engine 48. The application 42 may be essentially any kind of application that supports voice-input commands for operation. One suitable type of application is the command and control application where discrete commands are issued to cause a particular function to occur. As possible examples, the application 42 might be a program to operate a vehicle radio, or a program to locate an address or destination, or a program to operate a telephone, or a program to open files on a computer, and so forth.

The vocabulary 44 is the complete list of utterances that are recognized by the application. The vocabulary is stored in memory that can be accessed by the application. The active grammar 46 is a subset of the vocabulary that the recognition system is attempting to recognize at any one time. During operation, the application 42 extracts various sets of utterances from vocabulary 44 and registers them as the active grammar. The active grammar 46 is stored in short-term memory or cache, which is accessible by the application 42 and the speech recognition engine 46.

The speech recognition engine 46 performs the actual task of recognizing utterances in the active grammar. It compares the voice input from the operator with utterances in the active grammar 46. Upon detection of an utterance listed in the active grammar 46, the speech recognition engine 46 informs the application 42 of the particular utterance that has been recognized. The application 42 then performs the function associated with the utterance.

The speech recognition system 40 begins with a default grammar as the active grammar. The default grammar has both keywords and non-keywords. Upon detecting a word that is not a keyword in the default grammar, the speech recognition system 40 simply performs the function associated with the detected word. Upon detecting a keyword in the default grammar, however, the speech recognition system 40 temporarily expands its active grammar list from the default grammar to a ballooned grammar that includes both the words in the default grammar and the additional words triggered by detection of the keyword. That is, the application 42 extracts additional words from the vocabulary 44 and adds them to the active grammar 46. In this manner, the operator still has the option to select a word from the original grammar, or choose a word from the additional list.

The ballooned grammar remains active until the operator makes a new selection. With a bi-level system (meaning the system balloons the grammar only ii once), the speech recognition system 40 returns to the default grammar. In a higher level system in which multiple ballooned grammars may be used, the operator can work his/her way through the grammars, with each level including the words from the default grammar and words that are added along the way. At the end of the traversal through the levels, the speech recognition system 40 returns to the default grammar.

The discrete speech recognition system 40 can be used implemented in many different contexts. Two exemplary contexts are provided in this disclosure: an vehicle computer/entertainment accessory and a computing device. These implementations are discussed separately below.

Exemplary Context 1: Vehicle Accessory

Figure 4:
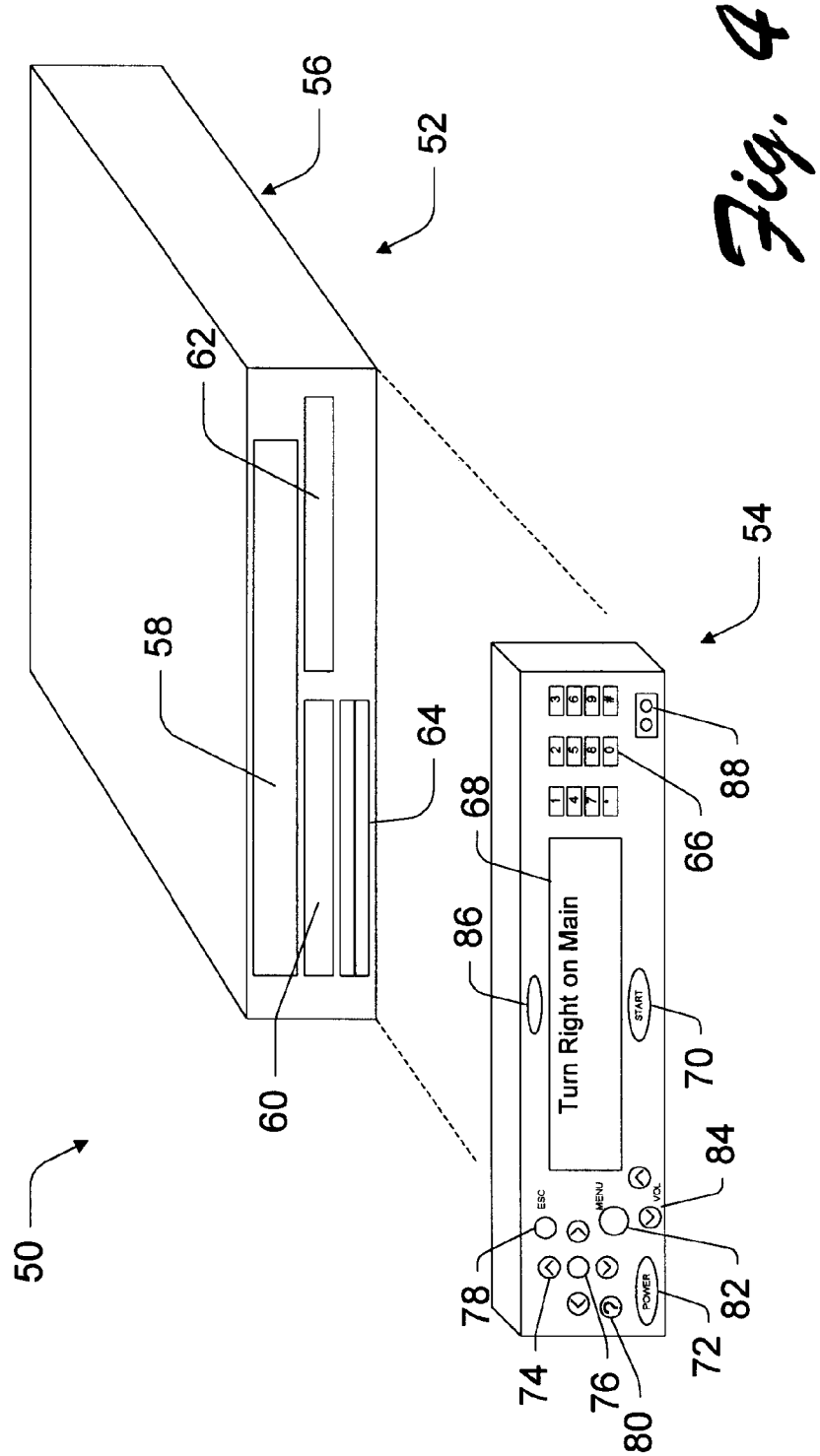
FIG. 4 is a diagrammatic illustration of a vehicle computer system that implements the discrete speech recognition system.

FIG. 4 shows an in-dash vehicle accessory 50 that implements the discrete speech recognition system 40. In the illustrated implementation, the vehicle accessory 50 is a vehicle computer system that includes a variety of different elements such as a security subsystem, a navigation subsystem, and an entertainment subsystem. In other embodiments, the accessory might be a car radio, cassette player, CD player, or similar device. The speech recognition system 40 facilitates voice activation of the accessory 50, or features thereof, to permit the driver to verbally enter commands in a hands-free, eyes-free environment.

Vehicle accessory 50 has a base module 52 and a detachable faceplate 54. Base module 52 includes a housing 56, which is sized to be mounted in a vehicle dashboard similar to a conventional car stereo. Preferably, housing 56 has a form factor of a single DIN (Deutsche Industry Normen). The base module could alternatively be housed in a 2 DIN unit or other special form factor for an OEM.

In the described implementation, base module 52 is a computer that runs a multi-tasking operating system to support multiple applications. One preferred operating system is a Windows brand operating system sold by Microsoft Corporation, such as Windows 95, Windows CE, Windows NT or other derivative versions of the Windows family of operating systems. The computer and operating system are configured to support after-market peripherals including both hardware and software components.

The computer 52 includes at least one storage drive that permits the vehicle user to download programs and data from a storage medium. In the illustrated implementation, the computer 52 has a CD ROM drive 58 that reads application-related CDs, as well as musical, video, game, or other types of entertainment CDs. In this manner, the CD ROM drive 58 performs a dual role of storage drive and entertainment player. Also, a hard disk drive (not shown in FIG. 4) that can be used for storing both application programs and user data is included on the computer module 52.

The computer base module 52 has an optional 3.5" floppy diskette drive 60, a smart card reader 62, and dual PCMCIA card sockets 64 which accept PC (or PCMCIA) card types II and III. The faceplate 54 can be rotated to expose and permit easy access to the storage drives. In other implementations, the faceplate 54 has slots to permit access to one or more of the memory drives.

Faceplate 54 has a keypad 66 and a graphical display 68. The display 68 is preferably a backlit LCD having a rectangular array of pixels that are individually selectable for illumination or display. The display element is a medium-resolution, bit-mapped display system having at least 10,000 pixels. In the described implementation, the array of pixels has a size of at least 64 by 256 pixels. The operating system of base module 52 interacts with faceplate keypad 66 and faceplate display 68 as peripheral devices when the faceplate 54 is attached to the base module 52.

The faceplate 54 has a start button 70 that provides the familiar "Start" functions of a Windows brand operating system. The faceplate 54 also has a power button 72, a four-position actuator 74, an "enter" button 76, an "escape" button 78, a "help" button 80, a "menu" button 82, and a volume control input 84.

The accessory 50 has a voice input port 86 that picks up voice commands for entry to the speech recognition system. The accessory also supports an IrDA (infrared developers association) transceiver port 88 mounted on the faceplate 54 to transmit and receive data and programs using infrared signals.

The vehicle accessory 50 can be used to integrate multiple vehicle-related systems onto one open platform. For instance, the accessory can serve as a multimedia entertainment system, a navigation system, a communications system, a security system, and a diagnostics system. Moreover, the accessory provides additional functionality traditionally associated with desktop and laptop personal computers. For instance, it can support word processing applications, spreadsheet applications, database applications, and appointment/schedule applications. Furthermore, the vehicle accessory 50 can be configured to operate as a server to other computing units in a vehicle to distribute games, video movies, and the like to passengers.

Vehicle accessory 50 may support a number of components and features that are not discussed herein. For more detail regarding such features refer to a U.S. patent application Ser. No. 08/564,586, entitled "Vehicle Computer System", which was filed Nov. 29, 1995 now U.S. Pat. No. 5,794,164 and is assigned to Microsoft Corporation. This application is hereby incorporated by reference.

For purpose of continuing discussion, suppose the discrete speech recognition system 40 is implemented to control the radio functionality of the computer/entertainment accessory 50. It is noted that the speech recognition system can be used to control many other functions in addition to the radio. For instance, the system can be used to control an address book program, as described below with reference to FIGS. 7–9. Other controllable functions include temperature control, operating a cellular phone, operating a CD player, locking and unlocking doors, lowering and raising windows, and so forth.

In the radio example, the speech recognition system 40 includes an application 42 that is configured for controlling the radio functionality and a vocabulary 44 with radio command utterances such as "AM", "FM", "Seek", "Scan", "Preset", "One", "Two", and so forth.

Figure 5:
FIG. 5 illustrates how a default grammar is expanded to a ballooned grammar according to an aspect of this invention.

FIG. 5 shows the process of ballooning the active grammar. This process is explained with additional reference to the steps shown in FIG. 6. At step 100 in FIG. 6, the radio command application extracts a default grammar from the vocabulary 44 and loads the default grammar into the active grammar 46. The default active grammar, referenced by number 90 in FIG. 5, contains five utterances: "AM", "FM", "Seek", "Scan", and "Preset". Table 4 contains the default grammar and associated functions.

TABLE 4

Default Grammar

| Word/Phrase | Command Function |
| --- | --- |
| AM | Sets the radio to AM band. |
| FM | Sets the radio to FM band. |
| Seek | Directs the radio to seek to a new station. |
| Scan | Directs the radio to scan for a new station. |
| Preset | Keyword to bring up list of stations |

The first four utterances-"AM", "FM", "Seek", and "Scan"-are non-is keyword utterances and the fifth"Preset"-is a keyword utterance.

Figure 6:
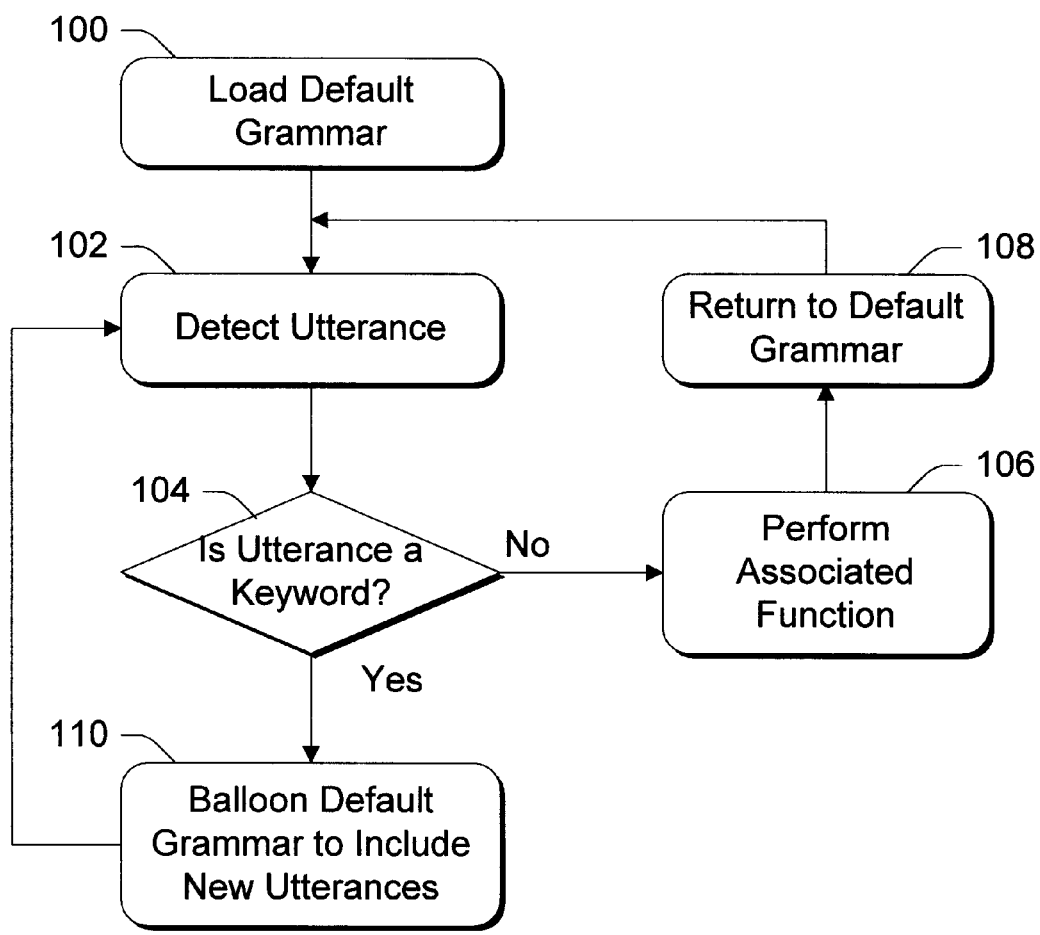
FIG. 6 is a flow diagram showing steps in a method for ballooning an active grammar.

At step 102 in FIG. 6, the speech recognition engine begins listening to speech patterns in an effort to detect an utterance contained in the default grammar 90. In the event the operator (e.g., vehicle driver) speaks a non-keyword utterance, such as "AM" (i.e., the "no" branch from step 104), the speech recognition system performs the associated function of setting the radio to the AM band (step 106 in FIG. 6). The default active grammar remains the same (step 108).

When the operator speaks the keyword "Preset" (i.e., the "yes" branch from step 104), the speech recognition system temporarily expands the default grammar to include an additional set of utterances triggered by the keyword (step 110 in FIG. 6). In this case, the extra terms are preset channel numbers that are activated by the keyword "Preset". Table 5 lists the ballooned grammar.

TABLE 5

Ballooned Grammar

| Word/Phrase | Command Function |
| --- | --- |
| AM | Sets the radio to AM band. |
| FM | Sets the radio to FM band. |
| Seek | Directs the radio to seek to a new station. |
| Scan | Directs the radio to scan for a new station. |
| Preset | Keyword to bring up list of stations |
| One | Sets the radio to preset station 1. |
| Two | Sets the radio to preset station 2. |
| Three | Sets the radio to preset station 3. |
| Four | Sets the radio to preset station 4. |
| Five | Sets the radio to preset station 5. |
| Six | Sets the radio to preset station 6. |
| Seven | Sets the radio to preset station 7. |
| Eight | Sets the radio to preset station 8. |
| Nine | Sets the radio to preset station 9. |
| Ten | Sets the radio to preset station 10. |

As shown in FIG. 5, the extra words "One", "Two", ..., "Ten" are added to the ballooned active grammar 92. Notice that the original default words are still present. If the operator made a mistake and would still like to enter a default command, like "AM" or "Scan", the operator is able to speak such a command and have the system respond.

After the grammar is expanded, the system continues to monitor for any utterance in the ballooned grammar (step 102). The operator can speak one of the original default commands, or one of the added commands. The system maintains this ballooned grammar until the system detects one of the utterances listed therein. Suppose the operator says the word "One". The speech recognition system recognizes the utterance "One", as represented by numeral 94 in FIG. 5. Since this is not a keyword (i.e., the "no" branch from step 104 in FIG. 6), the system performs the associated function of setting the radio to the preset station 1, as represented by number 96 in FIG. 5 (i.e., step 106 in FIG. 6).

After the associated operation is performed, the speech recognition system returns to the small default grammar (step 108 in FIG. 6). This is represented diagrammatically in FIG. 5 by the dashed return arrow to the default grammar 90.

Exemplary Context 2: Computing Device

Figure 7:
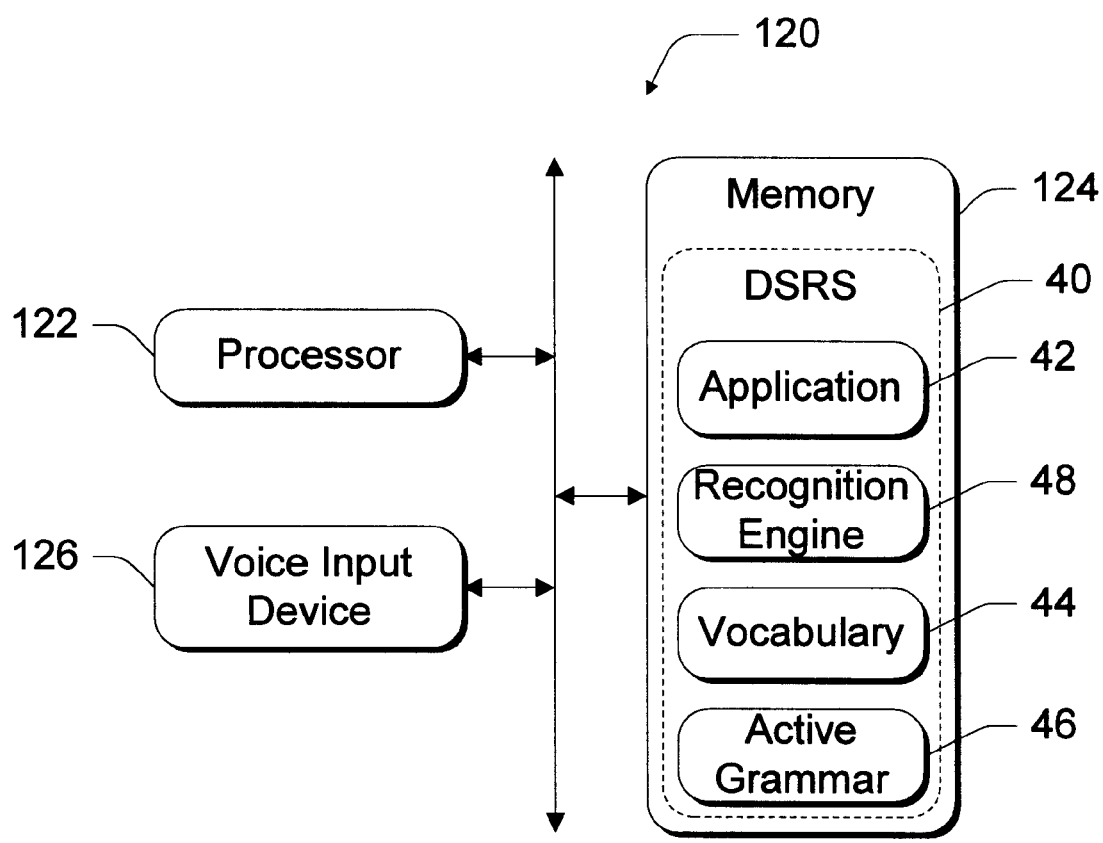
FIG. 7 is a block diagram of a more general computer device used to Implement the speech recognition system.

The speech recognition system may be implemented in other contexts than a vehicle accessory. To provide another example for discussion purposes, FIG. 7 is a simplified block diagram of a computing device 120 that implements the discrete speech recognition system (DSRS) 40. The computing device 120 has a processor 122, associated addressable memory 124 (including non-volatile memory and high-speed volatile memory), and a voice input device 126. In this implementation, the speech recognition system 40 is embodied as a software program that is stored in memory 124 and executes on the processor 122. The program has an application 42, a predefined vocabulary 44, an active grammar 46, and a recognition engine module 48.

Figure 8:
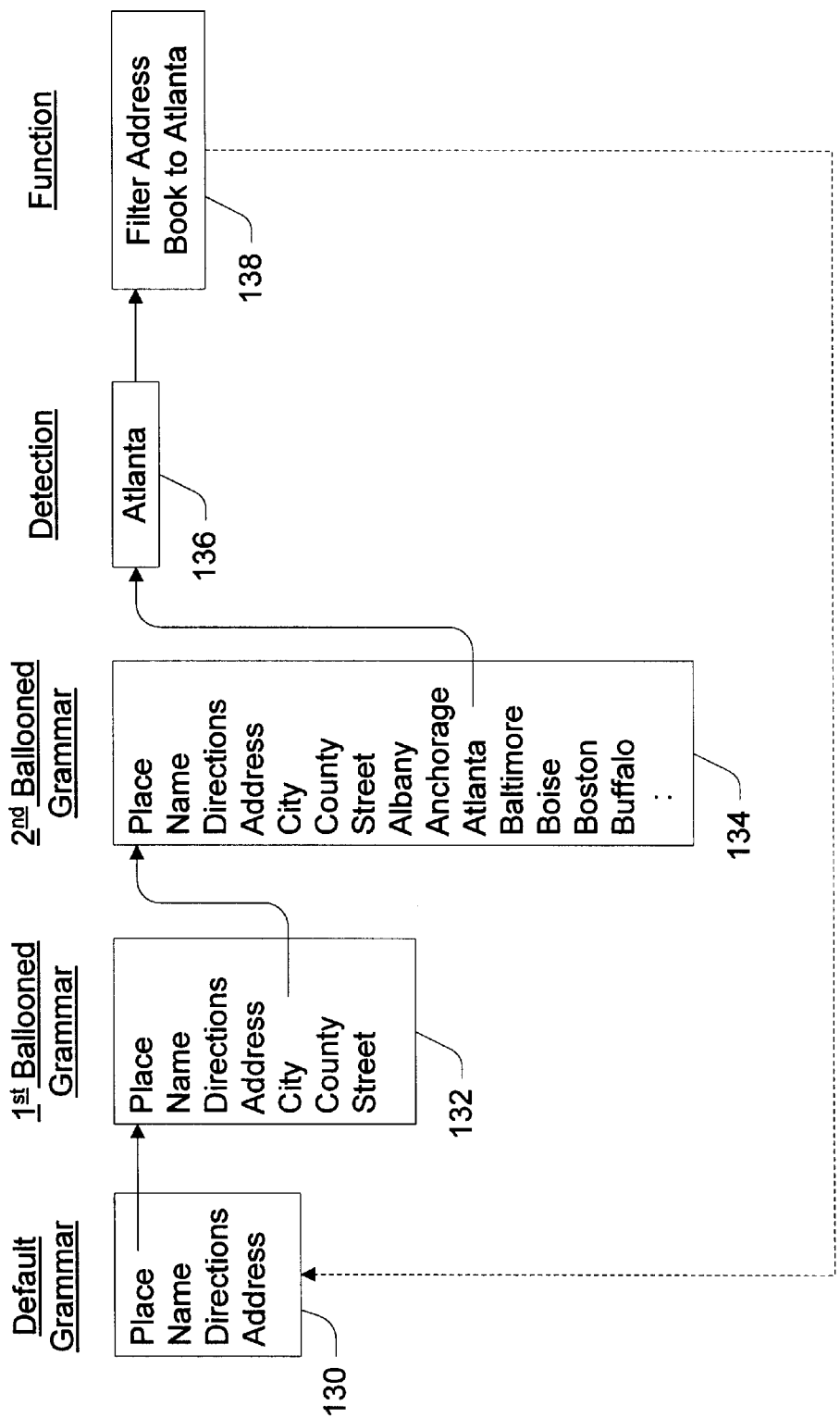
FIG. 8 illustrates how a default grammar is expanded multiple times to create multiple ballooned grammars according to another aspect of this invention.

FIG. 8 shows a higher level process that allows multiple ballooning tiers of the active grammar. This process is explained with reference to the steps in FIG. 6. For this example, the application 42 is an address book program that manages addresses and provides directions to locate the address. The default grammar 130 is initially loaded as the active grammar (step 100 in FIG. 6). The default active grammar 130 contains four utterances: "Place", "Name", "Directions", and "Address". Suppose the word "Place" is a keyword and the speech recognition engine detects the keyword "Place" (step 102 in FIG. 6). Since this is a keyword (i.e., the "yes" branch from step 104 in FIG. 6), the default grammar is temporarily expanded to a first ballooned grammar 132 that adds the utterances "City", "County", and "Street" (step 110).

Suppose that word "City" in the first ballooned grammar 132 is also a keyword. When the speech recognition engine detects the keyword "City" (step 102 in FIG. 6), the first ballooned grammar is further expanded to a second ballooned grammar 134 that adds the names of various U.S. cities, such as "Albany", "Anchorage", "Atlanta", "Baltimore", "Boise", "Boston", "Buffalo", and so forth (step 110). The second ballooned grammar 134 thus contains the original words in the default grammar 130, the added words in the first ballooned grammar 132, and the new city names.

Suppose the operator says the word "Atlanta". The speech recognition system recognizes the utterance "Atlanta", as represented by numeral 136 in FIG. 8. Since this is not a keyword (i.e., the "no" branch from step 104 in FIG. 6), the system performs the associated function of filtering the address book to entries pertaining to the city Atlanta, as represented by number 138 in FIG. 8 (i.e., step 106 in FIG. 6).

After the associated operation is performed, the speech recognition system returns to the small default grammar (step 108 in FIG. 6). This is represented diagrammatically in FIG. 8 by the dashed return arrow to the default grammar 130.

Figure 9:
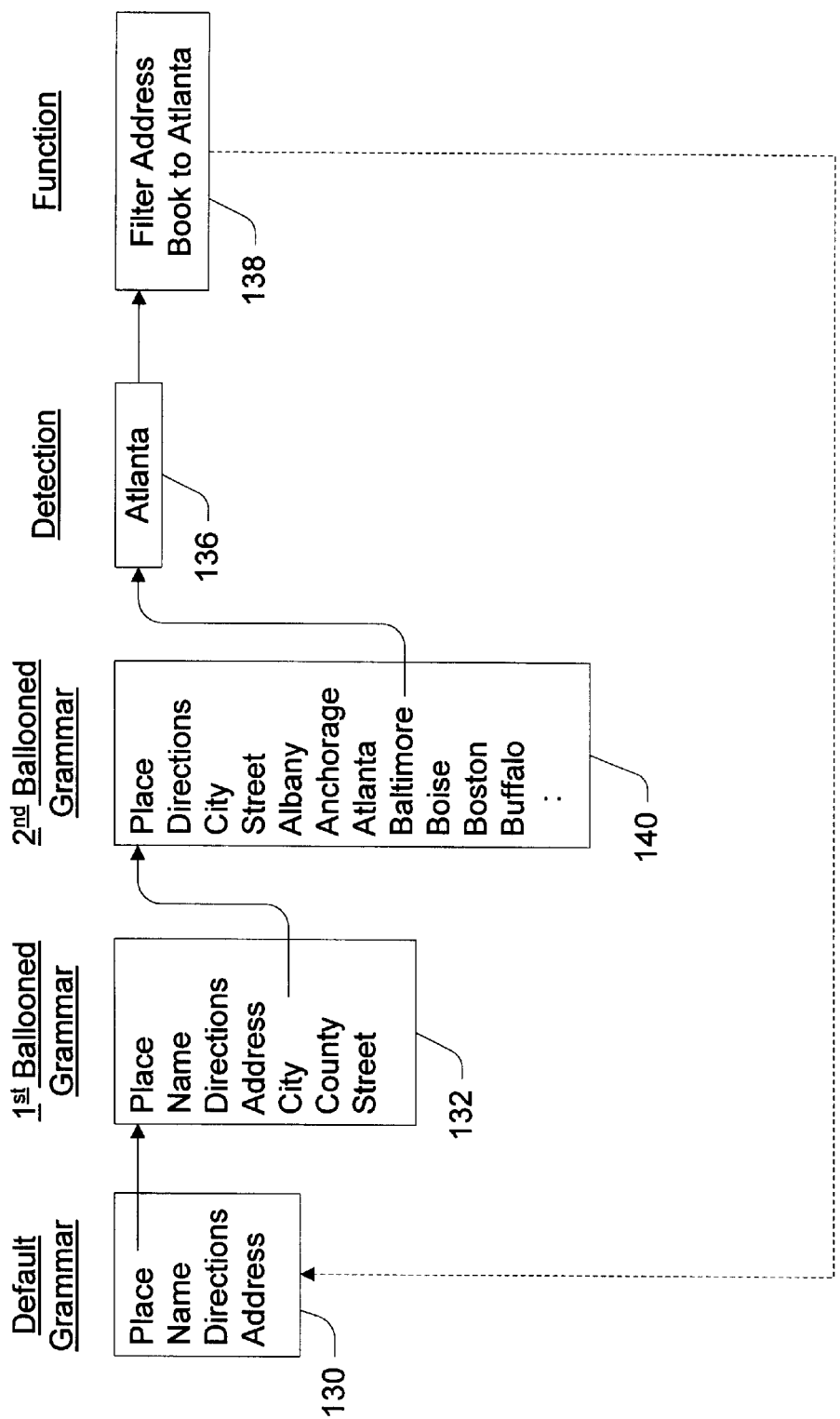
FIG. 9 illustrates how a default grammar is expanded through multiple times to create multiple ballooned grammars, but with active removal of unwanted terms, according to another aspect of this invention.

FIG. 9 shows a variation of the FIG. 8 process. In the FIG. 9 ballooning process, words that are effectively rendered useless by subsequent selections are removed from the active ballooned grammar. The default grammar 130 and the first ballooned grammar 132 are the same as in FIG. 8. However, when the system detects the keyword "City" and the first ballooned grammar 132 is expanded to include the city names, the speech recognition system also removes certain words that are no longer useful. In this case, the words "Name" and "Address" from the default grammar are removed and the word "County" from the first ballooned grammar is removed. This selective reduction helps keep the active grammar as small as possible.

The discrete speech recognition system is advantageous because it offers a flexible balance between small-size default grammars and greater functionality enabled by large size grammars to thereby mitigate the possibility of false or erroneous recognition. In general, the smaller the active grammar, the more reliable the recognition; whereas the larger the active grammar, the less reliable the recognition. In the described system, the default grammar is kept to a few words. The grammar is then expanded to a ballooned grammar that includes the original default words and extra words that enable a greater range of functionality. After a subsequent selection, the process is returned to the small default grammar.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A discrete speech recognition system comprising:
   an application;
   a vocabulary accessible by the application, the vocabulary holding a set of utterances applicable to the application;
   a speech recognition engine to recognize the utterances in the vocabulary;
   a grammar that holds a subset of the utterances in the vocabulary that is active at a particular instance for the speech recognition system to detect;
   wherein during a first instance, the grammar contains a default subset of utterances from the vocabulary, the default subset of utterances including at least one keyword utterance associated with a second subset of utterances from the vocabulary, the default subset of utterances further including at least one non-keyword utterance; and
   wherein during a second instance following detection by the speech recognition engine of the keyword utterance, the grammar is expanded to contain both the default subset of utterances and the second subset of utterances from the vocabulary, wherein the grammar remains expanded until a non-keyword utterance is detected.

2. A discrete speech recognition system as recited in claim 1, wherein the grammar remains expanded until an utterance from the expanded grammar is detected.

3. A discrete speech recognition system as recited in claim 1, wherein the grammar is returned to the default grammar after an utterance from the expanded grammar is detected.

4. A discrete speech recognition system as recited in claim 1, wherein the second subset of utterances contains another keyword associated with a third subset of utterances from the vocabulary, and during a third instance following detection of said another keyword, the grammar is expanded a second time to contain the default and second subsets of utterances and the third subset of utterances from the vocabulary.

5. A discrete speech recognition system as recited in claim 4, wherein selected utterances from the default or second subsets of utterances are removed from the doubly expanded grammar.

6. An entertainment system incorporating the discrete speech recognition system as recited in claim 1.

7. A computing device incorporating the discrete speech recognition system as recited in claim 1.

8. A discrete speech recognition system having an active grammar, the active grammar including a default set of utterances, the default set of utterances including at least one keyword utterance associated with a new set of utterances and at least one non-keyword utterance; wherein the discrete speech recognition system is configured to detect the keyword utterance and in response to expand the active grammar by temporarily adding the new set of utterances to the active grammar so that the active grammar used by the discrete speech recognition system temporarily includes the default set of utterances and the new set of utterances; and wherein the active grammar is reduced to the default set of utterances upon detection of a non-keyword utterance.

9. The discrete speech recognition system as recited in claim 8, wherein the active grammar is reduced back to include only the default set of utterances after detection of an utterance from the default set of utterances or the new set of utterances.

10. A vehicle system comprising:
    an entertainment system for providing entertainment to occupants of the vehicle; and
    the discrete speech recognition system as recited in claim 8, configured to detect utterances used to control the entertainment system.

11. A vehicle computer system comprising:
    a computer;
    an operating system executing on the computer, the operating system being configured to support multiple applications that are supplied by a vehicle user; and
    a discrete speech recognition system to detect utterances used to control at least one of the applications running on the computer, the speech recognition system having an active grammar that contains a default set of utterances, the default set of utterances having at least one keyword and at least one non-keyword; whereupon detection of the keyword, the speech recognition system is configured to expand the active grammar to include the default set of utterances and a new set of utterances, the active grammar remains expanded until a non-keyword utterance is detected.

12. A vehicle computer system as recited in claim 11, wherein the discrete speech recognition system reduces the active grammar back to the default grammar after an utterance from the expanded grammar is detected.

13. A vehicle computer system as recited in claim 11, wherein the new set of utterances contains another keyword and whereupon detection of said another keyword, the speech recognition system is configured to expand the active grammar a second time to include the default set of utterances, the new set of utterances, and a third set of utterances.

14. A vehicle computer system as recited in claim 13, wherein the speech recognition system removes selected utterances from the active grammar.

15. In a discrete speech recognition system, a method comprising the following steps:

loading an active grammar with a default set of utterances, the utterances having associated functions, the set of utterances containing at least one keyword associated with a new set of utterances, the set of utterances further containing at least one non-keyword;

detecting an utterance from the active grammar; and in an event that the detected utterance is a keyword, expanding the active grammar to include the default set of utterances and the new set of utterances, the active grammar remaining expanded until a non-keyword utterance is detected.

16. A method as recited in claim 15, further comprising the following additional steps:

detecting an utterance from the expanded active grammar; and reducing the active grammar to include only the default set of utterances.

17. A method as recited in claim 15, wherein the new set of utterances contains another keyword and further comprising the following additional steps:

detecting an utterance from the expanded active grammar; and in an event that the utterance detected from the expanded grammar is a keyword associated with a third set of utterances, expanding the active grammar to include the default set of utterances, the new set of utterances, and the third set of utterances.

18. A method as recited in claim 15, further comprising the step of removing selected utterances from the active grammar that is twice-expanded to include the default set of utterances, the new set of utterances, and the third set of utterances.

19. A computer-readable medium having computer-executable instructions for performing the steps in the method recited in claim 15.

20. In a discrete speech recognition system having an active grammar, the active grammar including a default set of utterances, and the default set of utterances including at least one keyword associated with a new set of utterances and including at least one non-keyword, a method comprising the step of ballooning the active grammar to temporarily include both the default set of utterances and the new set of utterances upon detection of the keyword, the active grammar remaining ballooned until a non-keyword utterance is detected.

21. A method recited in claim 20, further comprising the step of reducing the active grammar to include only the default set of utterances following recognition of an utterance from the active grammar.

22. A computer-readable medium having computer-executable instructions for performing the steps in the method recited in claim 20.

23. One or more computer-readable media having stored thereon a computer program that, when executed by a processor, causes the processor to:

load an active grammar with a default set of utterances, the utterances having associated functions, the default set of utterances containing at least one keyword associated with a new set of utterances, the default set of utterances further containing at least one non-keyword;

detect an utterance from the active grammar; and expand the active grammar to include the default set of utterances and the new set of utterances if the detected utterance is a keyword, the active grammar remaining expanded until a non-keyword utterance is detected.

24. One or more computer-readable media as recited in claim 23 wherein the computer program further causes the processor to:

detect an utterance from the expanded active grammar; and reduce the active grammar to include only the default set of utterances.

25. One or more computer-readable media as recited in claim 23 wherein the new set of utterances contains at least one keyword associated with a third set of utterances.

26. A discrete speech recognition system as recited in claim 1, wherein all utterances in the default subset of utterances are keyword utterances or non-keyword utterances.

27. A discrete speech recognition system as recited in claim 8, wherein utterances in the default set of utterances that are not keyword utterances are non-keyword utterances.

28. A vehicle computer system as recited in claim 11, wherein the default set of utterances that are not keyword utterances are non-keyword utterances.

29. A method as recited in claim 15, wherein all utterances in the default set of utterances are non-keyword utterances or keyword utterances.

30. A method as recited in claim 20, wherein all utterances in the default set of utterances are either keyword utterances or non-keyword utterances.

31. One or more computer-readable media as recited in claim 23, wherein the default set of utterances that are not keyword utterances are non-keyword utterances.

* * * * *

UNITED STATES PATENT AND TRADEMARK OFFICE
CERTIFICATE OF CORRECTION

PATENT NO. : 6,301,560 B1
DATED : October 9, 2001
INVENTOR(S) : Steven P. Masters Page 1 of 1

It is certified that error appears in the above-identified patent and that said Letters Patent is hereby corrected as shown below:

<u>Column 2,</u>
Line 24, delete "is" after "says".

Signed and Sealed this

Nineteenth Day of March, 2002

Attest:

Attesting Officer

JAMES E. ROGAN
*Director of the United States Patent and Trademark Office*